Dec. 10, 1957 | F. S. HARRIS | 2,816,056

PHONOGRAPH PICKUP

Filed Feb. 2, 1953 | 3 Sheets-Sheet 1

INVENTOR.
FRANCIS S. HARRIS
BY
Eber J. Hyde
ATTORNEY

Dec. 10, 1957

F. S. HARRIS 2,816,056

PHONOGRAPH PICKUP

Filed Feb. 2, 1953

3 Sheets-Sheet 2

INVENTOR.
FRANCIS S. HARRIS

BY Elber J. Hyde

ATTORNEY

Dec. 10, 1957 F. S. HARRIS 2,816,056

PHONOGRAPH PICKUP

Filed Feb. 2, 1953 3 Sheets-Sheet 3

INVENTOR.
FRANCIS S. HARRIS
BY
Eber J. Hyde
ATTORNEY

United States Patent Office 2,816,056

Patented Dec. 10, 1957

2,816,056

PHONOGRAPH PICKUP

Francis S. Harris, Burton, Ohio, assignor, by mesne assignments, to Clevite Corporation Application February 2, 1953, Serial No. 334,437

20 Claims. (Cl. 179—100.41)

Figure 1:
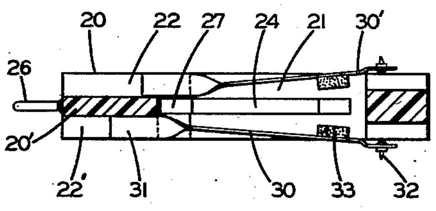

This invention pertains to a phonograph pickup and more particularly to a phonograph pickup having at least one stylus which, when not being used is decoupled from the transducer element. The application also deals with a multiple stylus phonograph pickup, particularly suitable for use with phonograph records having different groove widths, wherein the unused stylus is decoupled from the transducer element.

At the present time there are two different types of phonograph records on the market: The first of which is known as the standard type and is exemplified by 78 R. P. M. records, and the second of which is known as the microgroove type, exemplified by the RCA 45 R. P. M. record which has a large spindle opening and the long-playing 33⅓ R. P. M. records. The first type of record has a groove which is wide compared to the grooves in the microgroove types of records. This presents a problem to the manufacturer of record transducing equipment because it is preferable to use two different sized styli as as the stylus which is best suited to the 78 R. P. M. records is too big for the microgroove records and the stylus which is best suited for the microgroove records is too small for the 78 R. P. M. type record.

In order to solve this problem manufacturers are making pickup cartridges which have two styli; one for the 78 R. P. M. record and the other for the microgroove record. While one stylus tracks the record the other is not being used but is coupled to the transducer element.

The disadvantage in this existing type of multistylus transducers is that the mass of the unused stylus introduces highly undesirable resonance conditions resulting in a peaked transducer output and it also loads the transducer element, thereby greatly reducing the transducer output. Having the unusued stylus coupled to the element is particularly undesirable with the ceramic type pickups. The reason for this is that the ceramic elements are quite small and fragile compared to the well known crystal element. Because the ceramic element is so small the slightest bit of undesirable loading by the mass of the unused stylus very materially adversely affects the characteristics of the transducer.

A further disadvantage of the very fragile ceramic element is that it breaks easily. Consequently when a stylus which is coupled to the ceramic element is being changed there is danger of injury to the element.

It is an object of the present invention to provide a ceramic type phonograph pickup cartridge with a stylus which can easily be changed without danger of breaking the ceramic element.

Another object of the present invention is to provide a phonograph pickup cartridge having two stylus assemblies wherein the unused stylus assembly does not load the transducer element.

Another object of the present invention is to provide a multiple stylus phonograph pickup cartridge wherein all of the stylus assemblies are decoupled from the transducer element except during reproduction of a record, at which time only one stylus assembly is coupled to the element.

A further object of the present invention is to provide a multiple stylus phonograph pickup cartridge wherein the means of selecting the proper stylus for reproducing a record automatically couples the selected stylus to the transducer element.

For a better understanding of the present invention, together with other and further objects thereof, reference is had to the following description taken in connection with the accompanying drawings, and its scope will be pointed out in the appended claims.

Figure 2:
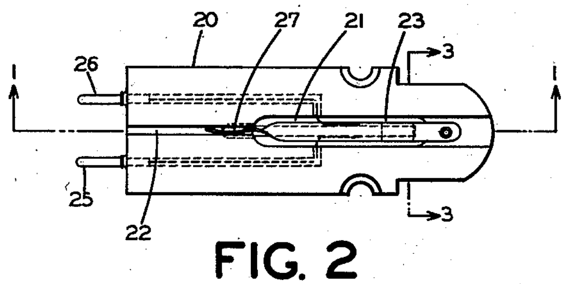
Figure 3:
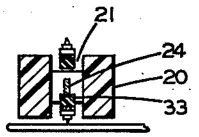
Figure 4:
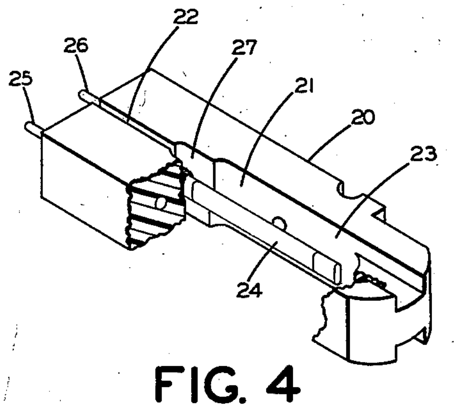
Figure 5:
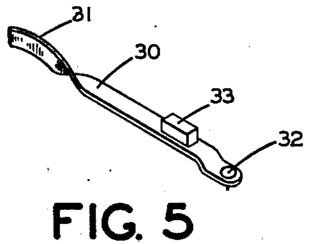

With reference to the drawings there is shown in Fig. 1 a cross section along line 1—1 of Fig. 2 showing a multiple stylus ceramic type phonograph pickup. Fig. 2 is a top view of the cartridge shown in Fig. 1; Fig. 3 is a sectional view taken along line 3—3 of Fig. 2; Fig. 4 is a partially broken away isometric view of the cartridge; Fig. 5 is an isometric view showing the replaceable stylus assembly used with the cartridge.

Figure 6:
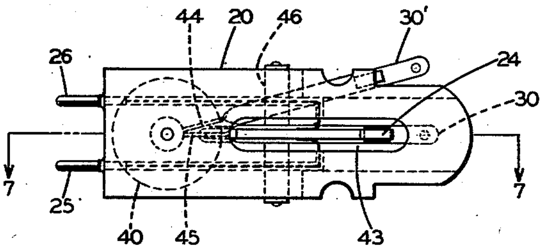
Figure 7:
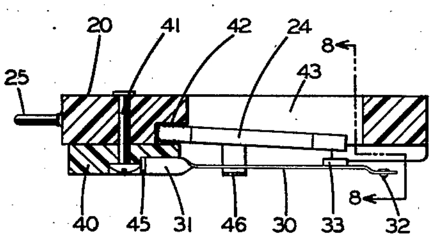
Figure 8:
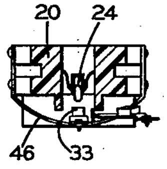
Figure 9:
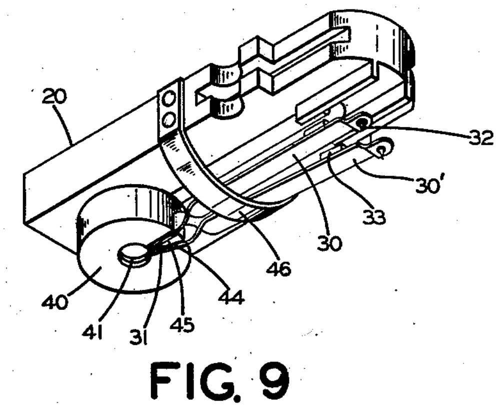

Fig. 6 is a top view of another embodiment of the invention; Fig. 7 is a sectional view taken along line 7—7 of Fig. 6; Fig. 8 is a sectional end view taken along line 8—8 of Fig. 7; Fig. 9 is an isometric view looking up at the bottom of the cartridge showing in particular the selector mechanism for selecting any one of the two stylus assemblies to be coupled to the transducer element.

Figure 10:
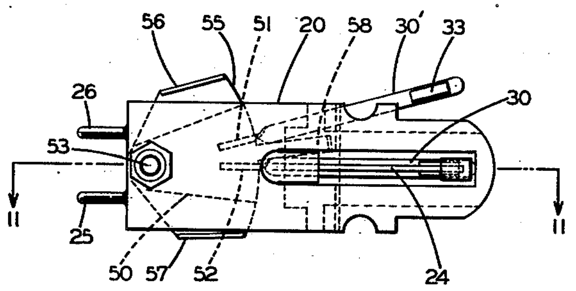
Figure 11:
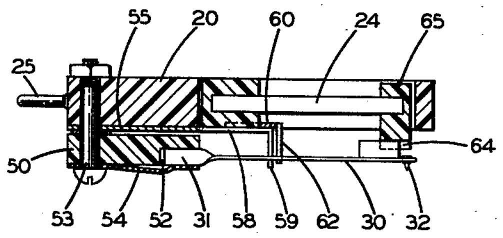
Figure 12:
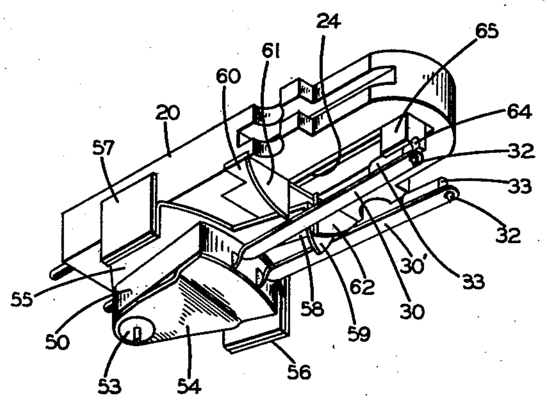

Figs. 10 to 12 are views showing another embodiment of the selector type pickup—Fig. 10 being a bottom view—Fig. 11 a sectional view taken along line 11—11 of Fig. 10 and Fig. 12 an isometric view looking up toward the bottom of the cartridge.

One aspect of the present invention is the provision of a phonograph pickup comprising a transducer element, one end of which is connected to a support and stylus means including a flexible arm connected at one end to the support and carrying at its other end a stylus tip. The stylus tip is positioned closely adjacent to but decoupled from the transducer element when the phonograph pickup is not tracking a record, but during reproduction of a record the flexible arm bends to cause the stylus tip to be coupled to the transducer element for actuating the element.

In a second aspect of the invention the phonograph pickup comprises a plurality of stylus means each including a flexible arm connected to the support and a stylus tip which is decoupled from the transducer element when the pickup is not tracking a record. When either of these stylus tips is tracking a record the arm to which it is connected bends to cause that stylus tip to be coupled to the transducer element the other stylus tip and arm remaining decoupled from the transducer element.

In a third aspect of the invention a selector is provided for selecting a particular one of several stylus means to be coupled to the transducer element. As the selected stylus means is moved into position for tracking a record it is automatically coupled to the transducer element and the stylus means which are not selected remain decoupled from the transducer element.

The first sheet of drawing shows one embodiment of the invention. It is comprised of a support 20 preferably formed of plastic material having a long, narrow channel 21 extending longitudinally along the center portion of the support. The slot 21 has a very narrow portion 22 which widens out to a larger portion 23.

The wide portion 23 of the slot extends completely through the base 20, but the narrow portion 22 extends less than halfway through and a similar narrow slot 22′ is formed in the underneath portion of the support or base 20. Between the two narrow slots 22, 22′ there is a solid section 20′ of the base 20, and immediately forward of this solid base portion 20′ is a slot portion 27 which is wider than the slot 22, 22′ and which extends completely through the base 20.

A long, narrow transducer element 24 has one of its ends cemented to the support 20 in the narrow slot 27 just forward of the solid section 20′ of the base. The transducer element 24 preferably is of the ceramic type, being formed of barium titanate material which is polarized and electroded as is known to the art. An example of a suitable transducer element may be found in Patent 2,596,494, issued May 13, 1952, to Thomas E. Lynch, for Ceramic Electromechanical Transducer. Electrical leads 25, 26 are secured in the support 20 and extend through to the transducer element 24 making suitable electrical connection therewith. Stylus means are provided which include a flexible arm 30 connected at one of its ends 31 to the support 20 and carrying at its other end a stylus tip 32. The end portion 31 of the flexible arm 30 is curved, as shown in Fig. 5, and preferably is replaceably held in the very narrow portion 22′ of the slot 21. The slot 22′ is sufficiently narrow that it flattens the curved end 31 of the stylus arm 30. Frictional forces set up by the curved end portion 31 engaging both sides of the narrow slot 22′ serve to hold the flexible arm 30 in the slot.

As seen in Fig. 1 the stylus tip 32 and the free end of the stylus arm 30 are closely adjacent to but spaced from the free end of the transducer element 24. This condition prevails when the stylus tip 32 is not tracking a record. However, when a tone arm holding the cartridge is in position to reproduce a record the unbalanced weight of the tone arm causes the flexible arm 30 to bend until a coupling pad 33 mounted on the top surface of the stylus arm 30 engages the lower edge of the transducer element 24. This couples the stylus tip 32 to the transducer element 24 and as the stylus tip is actuated laterally by the undulations of the record groove the forces are transmitted to the transducer element thereby generating an alternate signal corresponding to the record being reproduced. A cartridge of the above described type has the advantage that while the tone arm is in a nonreproducing position the stylus tip can very easily be changed. The stylus arm 30 need only to be pulled out from the narrow groove 22′ and a new stylus assembly, shown in detail in Fig. 5, slipped into place. Because the stylus tip and the stylus arm are decoupled from the transducer element when not playing a record there is no danger of breaking the very fragile element 24 while the stylus means is being removed and a new one inserted. As shown in the drawings the principle above described is adaptable not only to a single stylus cartridge but is also adaptable to a double stylus cartridge. The second stylus is clearly shown in Fig. 1 where a second stylus arm 30′ is secured to the support 20 by insertion in the groove 22 at a location above the transducer element 24. The stylus assembly 30′ may be removed and a new one inserted in a manner identical to the manner in which the stylus arm 30 is removed and a new one inserted.

The transducer shown on sheet 1 of the drawings is particularly adaptable to the dual stylus turnover type of pickup. The reason for this is that both stylus assemblies 30 and 30′ are decoupled from the transducer element 24 until such time as a selected stylus tip is lowered onto a record. When the selected stylus tip is tracking a record the selected stylus tip is coupled to the transducer element but the other stylus tip and its associated flexible stylus arm remain decoupled from the transducer element. This is more important in a ceramic pickup than it is in a crystal pickup because the ceramic elements are so small that the mass of the stylus arm and stylus tip approaches the mass of the transducer element. When this condition prevails it is quite important to decouple from a transducer element the mass of the unused stylus assembly.

The embodiment of the invention shown on the first sheet of the drawing is particularly adaptable to the dual stylus turn-over type of pickup.

The embodiment shown on the second sheet of drawing includes the dual stylus concept but instead of selecting the desired stylus by turning the cartridge over the cartridge remains in its fixed position and a selector mechanism moves the desired stylus into position. After the selected stylus is moved into position the tone arm is lowered until the stylus engages the record. The unbalanced weight of the pickup arm causes the flexible stylus arm to bend to establish a coupling connection between the selected stylus and the transducer element. As in the first embodiment the unused stylus arm is decoupled from the transducer element.

The embodiment shown in the second sheet of drawing comprises a base 20 preferably made of plastic material. A selector mechanism 40 is connected to the base 20 by a post 41 which extends through the selector mechanism 40 and the base 20. The selector mechanism 40 is connected to the base 20 in such a manner that it may be rotated with respect to the base, yet there are sufficient frictional forces existing between the mechanism 40 and the base 20 to maintain the selector mechanism in its selected position. The transducer element 24 is cemented in a slot 42 in the base 20 and it extends out into the wide opening 43. The two stylus arms 30, 30′ are similar to the stylus arm shown in Fig. 5. They are secured to the selector mechanism 40 in the following manner. The selector mechanism 40 has two narrow slots 44, 45. The curved end 31 of one of the flexible stylus arms is inserted in the narrow slot 45 with the stylus arm extending underneath and in a direction generally parallel to the transducer element 24. The other stylus arm is similarly secured in slot 44 in the selector mechanism. The pad 33 is soft and deformable, being made of Viscoloid or Korogel and is positioned closely adjacent to, but not in engagement with, the free end of the transducer element 24. The two stylus arms 30, 30′ extend out from the selector mechanism 40 at a slight angle with respect to each other. Thus, when one stylus arm, for example, as shown in Fig. 6, stylus arm 30, is directly below the transducer element 24 the other stylus arm 30′ is off to the side of the transducer element and is decoupled therefrom. By rotating the selector mechanism 40 with respect to the base 20 stylus arm 30′ may be positioned directly under the transducer element 24 at which time stylus arm 30 is positioned off to the side and is decoupled from the transducer element. The two ends of a band of thin, flexible material 46 are secured to either side of the base 20 with its central downwardly extending portion lying underneath the two flexible stylus arms 30, 30′. The band 46 does not engage the stylus arm which is coupled to the transducer element 24. It does, however, engage the other stylus arm and hold it up out of engagement with the record when the selected stylus arm is coupled to the transducer for reproducing a record.

The third embodiment of the invention is shown in Figs. 10 to 12, and is somewhat similar to the second embodiment in that a selector mechanism moves one of two stylus means into position so that the stylus tip is coupled to the transducer element during reproduction, the other stylus tip remaining decoupled. In the first and second embodiments the unbalanced weight of the pickup arm is needed to bend the stylus arm to effect the coupling. In the third embodiment, however, the selector mechanism causes the selected stylus to be coupled to the transducer element. The unbalanced weight of the pickup arm is not needed.

The selector mechanism comprises a movable plastic member 50 having stylus arm slots 51, 52 secured to the base 20 by bolt 53, and a metal plate 54 similarly secured to the base 20 and positioned to hold the stylus arms 30, 30′ in their respective slots 51, 52. A metal plate 55 is positioned between the base 20 and the plastic member 50, and includes two finger portions 56, 57 one on either side thereof by which the operator may move the plastic member 50 and consequently move both of the stylus arms. Connected to the plate 55 and movable with it is a finger 58 having a downwardly extending tip 59 positioned between the two stylus arms 30, 30′. Secured to the underneath side of the base 20 is a plate 60 having two spaced apart downwardly extending tips 61, 62 located closely adjacent to but not touching the tip 59. The outside edge surfaces of the tips 61, 62 are arcuate and the tips extend down below the position of the stylus arm when the stylus arms are in an unrestrained position.

Each of the two stylus arms 30, 30′ carries on its upper surface a small coupling pad 33, preferably made of a soft plastic material. When a stylus arm is in transducing position, for example stylus arm 30 in Figs. 10–12, the coupling pad fits into a groove 64 in a coupling pad 65 connected to the free end of the transducer 24, thus coupling the selected stylus 32 to the transducer. The natural bias of the flexible stylus arm 30 is such that the coupling pad 33 is urged up into the groove 64 in the coupling pad 65 and held there. To change styli the selector mechanism is rotated about bolt 53 by the operator who grasps the selector mechanism at the finger portions 56, 57 between his thumb and forefinger. This causes the finger 58 to move sideways into contact with the edge of stylus arm 30 and simultaneously the stylus arm 30, 30′ move sideways. Stylus arm 30 is moved up over the stationary tip 61 and it slides along the curved edge to a position out of the way of the transducing position for the stylus arm. Simultaneously the other stylus arm 30′ is sliding along the curved edge of the tip 62 until it reaches a location between the tips 61, 62, at which time the arm 30′ snaps upwardly toward the transducer element until the coupling pad 33 locks into groove 64 in the coupling pad 65.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A phonograph pickup comprising, in combination, a support, a transducer element one end of which is connected to said support, stylus means including a vertically flexible arm connected at one end to said support and carrying at its other end a stylus tip closely adjacent to but decoupled from said transducer element when not tracking a record, said flexible arm bending during reproduction of a record to cause said stylus tip to couple to said transducer element for actuating said transducer element.

2. A phonograph pickup comprising in combination, a support, a transducer element one end of which is connected to said support; stylus means including a vertically flexible arm connected at one end to said support and carrying at its other end tip means closely adjacent to but decoupled from said transducer element when not tracking a record; coupling means located between said transducer element and said stylus means coupling said stylus tip to said transducer element as said flexible arm is bent during reproduction.

3. A phonograph pickup comprising, in combination, a support; a transducer element one end of which is connected to said support; a plurality of stylus means each including a vertically flexible arm connected to said support and tip means decoupled from said transducer element when not tracking a record; each said arm, upon said stylus tip to which it is connected tracking a phonograph record, bending to cause said tracking stylus tip to be coupled to said transducer element.

4. A phonograph pickup comprising, in combination, a support, a transducer element one end of which is connected to said support, first stylus means including a first flexible arm connected at one end to said support and carrying at its other end first tip means closely adjacent to but decoupled from said transducer element when not tracking a record, second stylus means spaced from said first stylus means and including a second flexible arm connected at one end to said support and carrying at its other end second tip means positionable closely adjacent to but decoupled from said transducer element when not tracking a record, either of said first and second flexible arms being bent when the stylus carried by it is tracking a record to cause the tip means carried by said bent arm to couple to said transducer element for actuating said transducer element, the other of said flexible arms remaining decoupled from said transducer element.

5. A phonograph pickup cartridge for reproducing a grooved record comprising, in combination, a support; a transducer element one end of which is connected to said support; first and second stylus means each including a vertically flexible arm connected at one end to said support and carrying at its other end a stylus tip, selector means movably mounted on said support for moving a selected one of said stylus means into closely spaced but decoupled relationship to said transducer element, the vertically flexible arm of said selected stylus means being bent during reproduction of said record to cause the stylus tip of said selected stylus means to be coupled to said transducer element.

6. A phonograph pickup cartridge comprising, in combination, support means including a movable selector element; only a single transducer element one end of which is connected to said support means; a plurality of stylus means each including a stylus arm connected at one end to said support means and carrying at its other end a stylus tip normally decoupled from said transducer element; said selector element engaging at least a selected styus means for moving said seected stylus means with respect to said transducer element to a coupling position wherein during reproduction said selected stylus means is coupled to said transducer element, the other of said stylus means being decoupled from said transducer element.

7. A phonograph pickup cartridge as set forth in claim 6, further characterized by each of said stylus means including a flexible stylus arm which bends during reproduction to effect coupling between said selected stylus means and said transducer element.

8. A phonograph pickup cartridge comprising, in combination; a base; only a single transducer element one end of which is connected to said base and the other end of which is free from rigid connection thereto; selector means movably mounted on said base; a plurality of stylus means each including a flexible stylus arm connected at one end to said selector means and carrying at its other end a stylus tip adjacent said free end of said transducer element; said selector means upon being moved with respect to said base moving said stylus means with respect to said transducer element to position a portion of a selected one of said stylus means in coupling position with respect to said free end of said transducer element where, during tracking of a record by said selected stylus tip, the flexible stylus arm bends causing said selected stylus tip to couple to the free end of said transducer element, said other stylus tip remaining decoupled from said transducer element.

9. A phonograph pickup cartridge as set forth in claim 8, further characterized by each said stylus means being biased toward coupling engagement with said transducer element, means connected to said base acting against said bias to hold at least one of said stylus means out of coupling engagement with said transducer element, said selected stylus means when in coupling position being coupled to said transducer element due to said bias.

10. A phonograph pickup comprising, in combination, a support; only a single transducer element a fixed end of which is connected to said support and a free end of which is located away therefrom; a first flexible stylus arm a fixed end of which is connected to said support and a free end of which is spaced from the free end of said transducer element when in a non-transducing position; a second flexible stylus arm a fixed end of which is connected to said support and a free end of which is spaced from the free end of said transducer element when in a non-transducing position; selector means movably connected to said support and engaging said first and second flexible stylus arms for moving the free end of a selected one of said arms to a transducing position closely adjacent to the free end of said transducer element; the end of said selected arm closely adjacent to the free end of said transducer element being coupled to said transducer element during reproduction of a record.

11. A phonograph pickup comprising, in combination, a support; an elongated transducer element a fixed end of which is connected to said support and a free end of which is located away therefrom; a flexible stylus arm a fixed end of which is connected to said support and a free end of which is spaced from but is closely adjacent to the free end of said transducer element; a stylus tip carried by said stylus arm at said free end; said stylus arm, upon said stylus tip tracking a record, bending to cause the free end of said stylus arm to couple to the free end of said transducer element to transfer the forces exerted by said record on said stylus tip to said transducer element.

12. A phonograph pickup adapted to be mounted on a tone arm for playing two types of phonograph records comprising, in combination, support means to be mounted on said tone arm and at least a portion of which is adapted to be moved with respect to said tone arm for indexing at least the movable portion of the support means with respect to the tone arm for the reproduction of at least two different types of phonograph records; a transducer the fixed end of which is connected to the said support means and the free end of which is spaced from said support means for movement with respect thereto during reproduction of a record; first elongated stylus means extending in the length direction of said transducer, the inner end of which is connected to the movable portion of said support means and the outer end of which is adjacent the free end of said transducer; second elongated stylus means the inner end of which is connected to the movable portion of said support means and the outer free end of which is adjacent the end of said transducer; soft, deformable coupling means located between the outer end of the first stylus means and the free end of said transducer and in engagement with both constituting the sole driving connection from the first stylus means to the transducer; and soft, deformable coupling means located between the outer end of the second stylus means and the free end of said transducer and in engagement with both constituting the sole driving connection from the second stylus means to the transducer.

13. A phonograph pickup adapted to be mounted on a tone arm for playing two types of phonograph records comprising, in combination, support means to be mounted on said tone arm and at least a portion of which is adapted to move 180 degrees with respect to said tone arm for indexing at least the movable portion of the support means with respect to the tone arm for the reproduction of at least two different types of phonograph records; a transducer the fixed end of which is connected to the said support means and the free end of which is spaced from said support means for movement with respect thereto during reproduction of a record; first elongated stylus means extending in the length direction of said transducer, the inner end of which is connected to the movable portion of said support means and the outer end of which is adjacent the free end of said transducer; second elongated stylus means on the opposite side of said transducer 180 degrees from said first stylus means and the inner end of which is connected to the movable portion of said support means and the outer end of which is adjacent the free end of said transducer; the rotation of said movable portion of said support means indexing either one of said two stylus means for reproducing the phonograph record; soft, deformable coupling means located between the outer end of the first stylus means and said free end of said transducer and in engagement with both constituting the sole driving connection from the first stylus means to the transducer when the first stylus means is tracking a record; and soft deformable coupling means located between the outer end of the second stylus means and said free end of said transducer and in engagement with both constituting the sole driving connection from the second stylus means to the transducer when the second stylus means is tracking a record.

14. A phonograph pickup adapted to be mounted on a tone arm for playing two types of phonograph records comprising, in combination, support means to be mounted on said tone arm and at least a portion of which is adapted to move with respect to said tone arm for indexing at least the movable portion of the support means with respect to the tone arm for the reproduction of at least two different types of phonograph records; a transducer the fixed end of which is connected to the said support means and the free end of which is spaced from said support means for movement with respect thereto during reproduction of a record; first elongated stylus means extending in the length direction of said transducer, the inner end of which is connected to the movable portion of said support means and the outer end of which is adjacent the free end of said transducer; second elongated stylus means the inner end of which is connected to the movable portion of said support means and the outer end of which is adjacent the free end of said transducer; soft, deformable coupling means located between the outer end of the first stylus means and said free end of said transducer and in engagement with both constituting the sole driving connection from the first stylus means to the transducer when the first stylus means is tracking a record; and soft, deformable coupling means located between the outer end of the second stylus means and said free end of said transducer and in engagement with both constituting the sole driving connection from the second stylus means to the transducer when the second stylus means is tracking a record.

15. A phonograph pickup adapted to be mounted on a tone arm for playing a laterally cut phonograph record, comprising, in combination; supporting means including a hollow housing adapted to be mounted on said tone arm, a flexing type elongated electromechanical transducer element within said hollow housing, the first relatively fixed end of said element being mounted to said housing and the second relatively free end being free to move laterally with respect to said housing during record translation; a stylus arm extending the full length of said elongated transducer element and which has a first fixed end connected to said housing adjacent the fixed end of said transducer element, and which has a free end free to move laterally with respect to said housing during record translation and including a record engaging stylus, said arm being formed of flat spring material and including a twisted portion to provide compliance in two directions one vertical to the phonograph record and the other parallel to it; and a coupling pad of soft deformable material positioned between and engaging the free end of said transducer element and the free end of the stylus arm constituting the sole driving connection between said stylus arm and said transducer element during reproduction of a record; the vertical compliance of said stylus arm causing said arm to bend when the stylus is tracking a record to increase the coupling between said stylus tip and said transducer element during reproduction of a record.

16. A phonograph pickup adapted to be mounted on a tone arm for playing two types of laterally cut phonograph records with two styli, comprising, in combination; supporting means including a hollow housing adapted to be mounted on said tone arm and including an indexing portion movable with respect to said tone arm for indexing each of said two styli into record playing position; an elongated electromechanical transducer element within said hollow housing, the first relatively fixed end of said element being mounted to said housing and the second relatively free end being relatively free to move laterally with respect to said housing during record translation; a coupling pad of soft, laterally deformable damping material secured around the relatively free end of said transducer element; two stylus arms each of which has a first fixed end connected to the movable indexing portion of the support means adjacent the fixed end of said transducer element, and each of which has a second free end free to move laterally with respect to said housing during record translation and each carrying a record engaging stylus, each of said two stylus arms being formed of flat spring stock extending from one end of said transducer element to the other and having a twisted portion between the stylus and the fixed end thereof to provide compliance in two directions one vertical to the phonograph record and the other parallel to it, and the stylus arm whose stylus is in engagement with the phonograph record being coupled to the transducer element solely through said coupling pad, said vertical compliance of said stylus arms causing the selected arm to bend when the selected arm and stylus are tracking a record to increase the coupling between the stylus tip and said transducer element during reproduction of a record.

17. A phonograph pickup adapted to be mounted on a tone arm for playing two types of laterally cut phonograph records with two styli comprising, in combination; supporting means including a hollow housing adapted to be mounted on said tone arm and including an indexing portion movable with respect to said tone arm for indexing each of said two styli into record playing position; an elongated electromechanical transducer element within said hollow housing, the first relatively fixed end of said element being mounted to said housing and the second relatively free end being relatively free to move laterally with respect to said housing during record translation; a coupling pad of softer more deformable material than said transducer element connected to the relatively free end of said transducer element; two stylus arms each of which has a first fixed end connected to the movable indexing portion of the support means and a second free end free to move laterally with respect to said housing while it is translating a record and carrying a record engaging stylus, each of said two stylus arms being formed of flat spring stock having a portion with a twist located between said fixed end and said stylus to provide compliance in two directions, and the stylus arm whose stylus is in engagement with the phonograph record being coupled to the transducer element through said coupling pad and extending substantially parallel to said transducer element substantially the entire length of of said elongated element.

18. A phonograph pickup adapted to be mounted on a tone arm for playing two types of laterally cut phonograph records with two styli comprising, in combination; supporting means adapted to be mounted on said tone arm and including plastic housing means at least a portion of which is rotatable with respect to said supporting means for indexing each of said two styli into record playing position, an elongated electromechanical transducer element within said housing means, the first relatively fixed end of said element being mounted to said housing and the second relatively free end being relatively free to move laterally with respect to said housing during record translation; a coupling pad of soft deformable material connected to the relatively free end of said transducer element; two stylus arms each of which has a first fixed end connected to the rotatable portion of said supporting means and a second free end free to move laterally with respect to said housing during record translation and carrying a record engaging stylus, each of said two stylus arms being formed of flat spring stock having a portion with a twist located between said fixed end and said stylus, and the stylus arm whose stylus is in engagement with the phonograph record being coupled to the transducer element through said coupling pad and extending substantially parallel to said transducer element substantially the entire length of said elongated element.

19. A phonograph pickup adapted to be mounted on a tone arm for playing two types of laterally cut phonograph records with two styli comprising, in combination; plastic supporting means including a hollow housing adapted to be mounted on said tone arm; an elongated electromechanical transducer element within said hollow housing, the first relatively fixed end of said element being mounted to said housing and the second relatively free end being relatively free to move laterally with respect to said housing during record translation; two styli arms each of which has a first fixed end connected to the hollow housing and a second free end free to move laterally with respect to said housing during record translation and carrying a record engaging stylus, each of said two stylus arms being formed of flat spring stock extending in the length direction of said element with the width of the flat stock oriented to effectively transmit lateral motions of the stylus tip to the transducer element and having a portion with a twist located between said fixed end and said stylus; and coupling means of soft deformable material in engagement with each said stylus arm and in engagement with said transducer element during reproduction of a record by a given stylus.

20. A phonograph cartridge of the dual-stylus turnover type adapted to be mounted on a tone arm for playing two types of laterally cut phonograph records comprising, in combination; plastic supporting means having a hollow central portion; an elongated electromechanical transducer element within said hollow housing, the first relatively fixed end of said element being mounted to said housing and the second relatively free end being relatively free to move laterally with respect to said housing during record translation; two stylus arms each of which has a first fixed end connected to the hollow housing and a second free end free to move laterally with respect to said housing during record translation and carrying a record engaging stylus, each of said two stylus arms being formed of flat spring stock extending in the length of direction of said element, and having a portion with a twist located between said fixed end and said stylus, one of said stylus arms being mounted to one side of said transducer element and the other stylus arm being mounted 180 degrees opposite said first stylus arm; and coupling means of soft deformable material in engagement with each said stylus arm, and in engagement with said transducer element during reproduction of a record by a given stylus.

References Cited in the file of this patent

UNITED STATES PATENTS

| | | |
|---|---|---|
| 2,328,952 | Burt | Sept. 7, 1943 |
| 2,492,446 | Schumann | Dec. 27, 1949 |
| 2,567,105 | Dreisback | Sept. 4, 1951 |
| 2,570,578 | Martin | Oct. 9, 1951 |
| 2,575,999 | Cordes | Nov. 20, 1951 |